United States Patent
Matsuda et al.

(10) Patent No.: US 7,545,655 B2
(45) Date of Patent: Jun. 9, 2009

(54) INVERTER APPARATUS

(75) Inventors: Kensaku Matsuda, Tokyo (JP); Tarou Andou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 354 days.

(21) Appl. No.: 10/557,039

(22) PCT Filed: May 29, 2003

(86) PCT No.: PCT/JP03/06756

§ 371 (c)(1),
(2), (4) Date: Nov. 16, 2005

(87) PCT Pub. No.: WO2004/107551

PCT Pub. Date: Dec. 9, 2004

(65) Prior Publication Data

US 2007/0075585 A1    Apr. 5, 2007

(51) Int. Cl.
H02M 5/45    (2006.01)
(52) U.S. Cl. .......................... 363/37; 363/65
(58) Field of Classification Search ............... 307/11, 307/16, 19, 21, 25, 28, 18; 363/37, 63, 65
See application file for complete search history.

(56) References Cited

U.S. PATENT DOCUMENTS 4,973,896 A * 11/1990 Shiga et al. .................. 322/28
6,642,633 B1 * 11/2003 Yang ........................... 307/147
2002/0031000 A1 * 3/2002 Sakai et al. .................. 363/65
2002/0041502 A1 * 4/2002 Ulinksi et al. ................ 363/37
2002/0122322 A1 * 9/2002 Oughon, Jr. .................. 363/37
2003/0007369 A1 * 1/2003 Gilbreth et al. ............... 363/35

FOREIGN PATENT DOCUMENTS

| JP | 2-164275 A | 6/1990 |
| JP | 3-173356 A | 7/1991 |
| JP | 6-57093 U | 8/1994 |
| JP | 9-233830 A | 9/1997 |
| JP | 11-122946 A | 4/1999 |
| JP | 11-146573 A | 5/1999 |
| JP | 2000-92744 A | 3/2000 |
| JP | 2000-217367 A | 8/2000 |

* cited by examiner

Primary Examiner—Akm E Ullah
Assistant Examiner—Nguyen Tran
(74) Attorney, Agent, or Firm—Sughrue Mion, PLLC

(57) ABSTRACT

An inverter apparatus in which a control power source connected to a microcomputer or a peripheral circuit included in at least one of an inverter main body, a built-in option, and a parameter unit is provided in the inverter main body. The apparatus has an external-power-unit connector via which an external power unit can be connected to at least one of the inverter main body, the built-in option, and the parameter unit. The external power unit connected to the external-power-unit connector is configured to function as a power source that controls the microcomputer or the peripheral circuit included in at least one of the inverter main body, the built-in option, and the parameter unit.

7 Claims, 3 Drawing Sheets

INVERTER APPARATUS

TECHNICAL FIELD

The present invention relates to an inverter apparatus in which an external power unit instead of or in addition to a control power source is connected to a microcomputer or a peripheral circuit.

BACKGROUND ART

An outline of a conventional inverter apparatus will be roughly explained. The inverter apparatus is used to drive for example induction motor at a variable velocity with the commercial power source. Therefore, an inverter main circuit in the main body of the inverter apparatus includes a converter unit connected to the commercial power source, a rush-current-suppressing resistor, an inverter unit connected to the induction motor, and an inverter drive IC (hereinafter, "HVIC") for controlling ON/OFF of a switching element of the inverter unit.

In the inverter main body, control power sources are additionally generated from the commercial power source. Specific examples of such control power sources are a control power source for controlling the HVIC and a control power source for controlling a relay for short-circuiting the rush-current-suppressing resistor, which are both provided in the inverter main circuit, a control power source for controlling an inverter control unit including a ROM and/or a microcomputer and a control power source for controlling an internal option including a microcomputer, which are both provided in the inverter main body, and a control power source for controlling a parameter unit including a microcomputer, which is provided outside the inverter main body.

In generating the control power sources, the commercial power-supply voltage is rectified and converted into a DC voltage in the inverter main body, a capacitor is then charged with this DC voltage, ON/OFF of the voltage charged in the capacitor is then controlled at a transistor, and the voltage subjected to the ON/OFF control is stepped down via a power transformer. As a result, various control power sources required are generated.

In the conventional inverter apparatus, various control power sources generated in the inverter main body are connected to the microcomputer and/or the peripheral circuit provided in the inverter apparatus including the inverter main body. Communications can thus be performed between the inverter control unit, the parameter unit, and the built-in option.

However, in the conventional inverter apparatus, the various control power sources are generated from the commercial power source in the inverter main body. Therefore, the commercial power source is required to be connected to the inverter main body even when a setting of the microcomputer and/or the peripheral circuit of the inverter apparatus is to be checked or changed with the control power sources, i.e., even when the inverter main circuit is not required to be driven. Therefore, electric power cannot be supplied to the microcomputer and/or the peripheral circuit, and communications cannot be established between the parameter unit and the built-in option when the inverter apparatus is out of order, or when the inverter apparatus is being moved, or when the inverter apparatus is being installed, i.e., when the commercial power source cannot be connected to the inverter main body. As a result, conventionally, the setting of the microcomputer and/or the peripheral circuit of the inverter apparatus cannot be checked or changed if the commercial power source cannot be connected to the inverter main body.

In Japanese Patent Application Laid-Open No. H11-146573 (FIG. 2) (hereinafter, "Patent Document 1"), an invention for reducing power consumption in a standby state of an electrical device is described. According to the invention of Patent Document 1, a microcomputer that controls electrical components is incorporated into a control board to which peripheral devices, such as a warm-water washing device, a warm toilet seat, and a remote control unit, are connected, and a main power source and an auxiliary power source connected to the commercial power source are connected to the microcomputer. When a power switch is off, the commercial power source and the main power source are disconnected from each other, and are in a standby state. In the standby state, electric power is continuously supplied only to the microcomputer by the auxiliary power source. After that, when the power switch is turned on, a signal is sent to the power source switch from the microcomputer, and the commercial power source and the main power source are reconnected to each other again. According to Patent Document 1, the power source is connected only to the microcomputer of the control board. Therefore, when the peripheral device is in the vicinity (e.g., a washing toilet), a serious problem does not occur. However, when the peripheral device is away from the microcomputer, the power source is connected only to the microcomputer, and hence the power source cannot be connected to the peripheral device, and the peripheral device may become inoperable. Additionally, according to Patent Document 1, the power source is not connected to the peripheral circuit unless the power of the commercial power source is supplied to the main power source, and hence, for example, information cannot be exchanged with the peripheral device.

In Japanese Patent Application Laid-Open No. 2000-92744 (FIG. 1) (hereinafter, Patent Document 2), an invention characterized in that, when an abnormality occurs in a power source system from which electric power is supplied to an option device side, only a driving power source to the option device is cut off to connect only a control power source. In other words, the voltage and current of the driving power source of the option device side are monitored, and, when an abnormality occurs therein, the power source system of the option device side is stopped, and, instead, the power of the option-device control system power source is supplied from the power source system of a main body side. Therefore, a power source for communication is there even if the driving power source is stopped, and, accordingly, communications is continuously performed between the main body and the option device. However, according to Patent Document 2, the commercial power source is always necessary for supplying electric power to the option device, and hence communications cannot be performed between the main body and the option if there is no commercial power source.

Therefore, it is an object of the present invention to provide an inverter apparatus in which, even when a commercial power source cannot be connected to an inverter apparatus or even when a control power source is cut off, a setting of a microcomputer of the inverter apparatus or a setting of a peripheral circuit of the inverter apparatus can be checked or changed.

DISCLOSURE OF INVENTION

An inverter apparatus according to an aspect of the present invention, in which a control power source connected to a microcomputer or a peripheral circuit included in at least one of an inverter main body, a built-in option, and a parameter unit is provided in the inverter main body, includes: an external-power-unit connector via which an external power unit can be connected to at least one of the inverter main body, the built-in option, and the parameter unit, wherein the external power unit connected to the external-power-unit connector is configured to function as a power source that controls the microcomputer or the peripheral circuit included in at least one of the inverter main body, the built-in option, and the parameter unit.

An inverter apparatus according to another aspect of the present invention, is characterized in that a type of the external-power-unit connector and a type of the external power unit are set according to a voltage level of the control power source.

An inverter apparatus according to yet another aspect of the present invention, is characterized in that the apparatus further includes a plurality of control power sources, wherein voltage levels of the control power sources are all of equal potentials.

An inverter apparatus according to still another aspect of the present invention is characterized in that at least one of the external-power-unit connector and the external power unit comprises a backward-flow preventing unit and an overcurrent preventing unit.

An inverter apparatus according to still another aspect of the present invention is characterized in that the peripheral circuit includes a peripheral device connected to an external I/O of the built-in option.

BEST MODE FOR CARRYING OUT THE INVENTION

Embodiments of an inverter apparatus according to the present invention will be hereinafter explained in detail with reference to the drawings. The present invention is not limited to these embodiments.

First Embodiment

Figure 1:
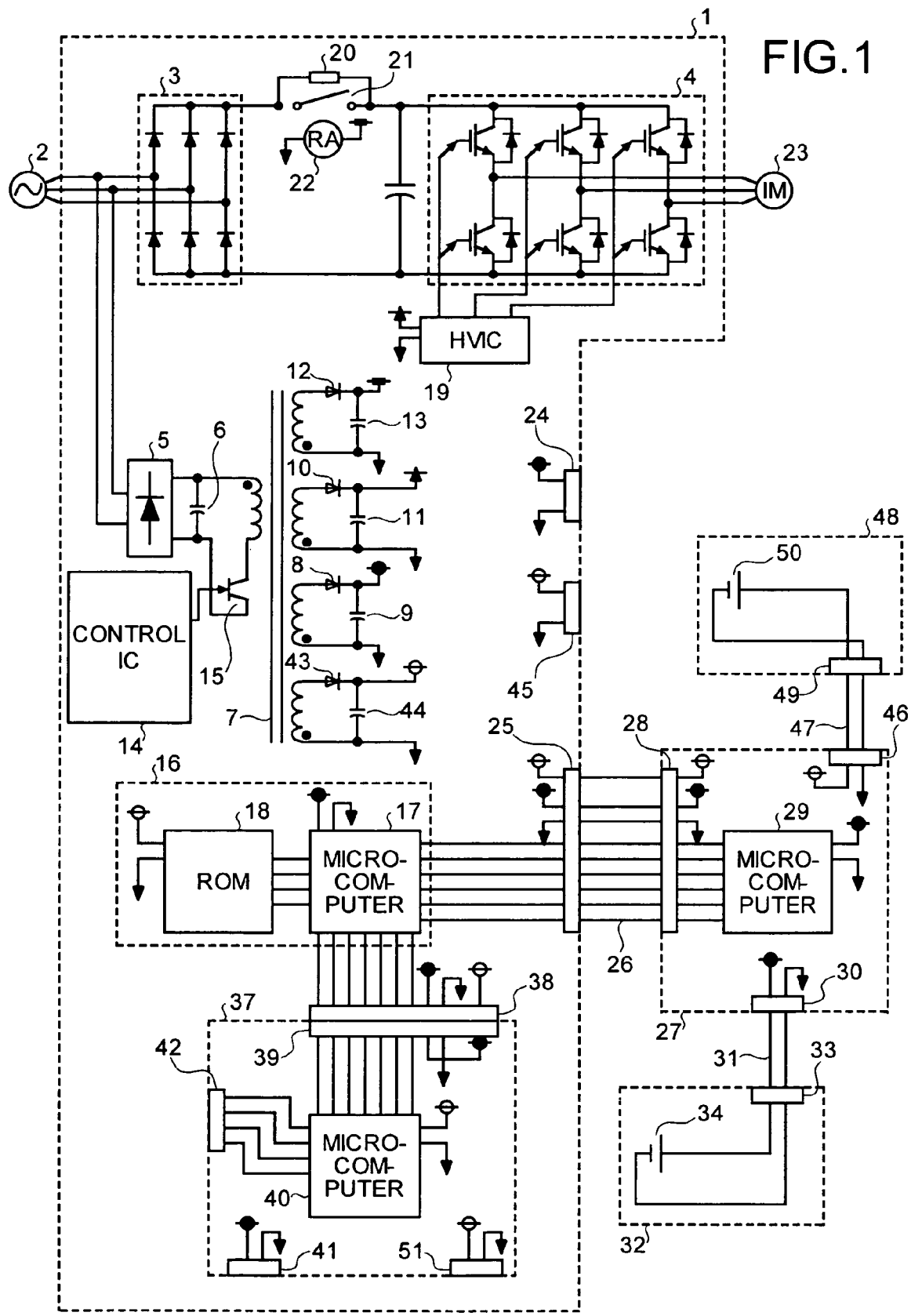
FIG. 1 is an illustration of a configuration of an inverter apparatus according to a first embodiment of the present invention.

FIG. 1 is an illustration of an inverter apparatus according to a first embodiment. An inverter main circuit of an inverter main body 1 includes a converter unit 3 connected to a commercial power source 2, an inverter unit 4 connected to an induction motor 23, a rush-current-suppressing resistor 20 interposed between the converter unit 3 and the inverter unit 4, a switch 21 disposed in parallel with the rush-current-suppressing resistor 20, a relay 22 that controls ON/OFF of the switch 21, and an inverter driving IC (hereinafter, "HVIC") 19 for controlling ON/OFF of switching elements bridge-connected in the inverter unit 4.

In the inverter main circuit, a commercial power-supply voltage is converted into direct current at the converter unit 3, and the direct current is converted into alternating current by the inverter unit 4 based on the switching control by the HVIC 19 while preventing rush current, so that the induction motor 23 is controlled.

Control power sources are made from the commercial power source 2 in the inverter main body 1. The control power sources has a structure including a diode bridge 5 connected to the commercial power source 2, and a commercial smoothing capacitor 6 on an output side of the diode bridge 5. In the structure, a primary side of a power transformer 7 and a control power transistor 15 are connected in series with the commercial smoothing capacitor 6, and the charging voltage of the commercial smoothing capacitor 6 is transformed and output at a secondary side of the power transformer 7.

Therefore, to make the control power sources, a commercial power-supply voltage is rectified by the diode bridge 5 and is converted into a DC voltage in the inverter main body 1, the commercial smoothing capacitor 6 is then charged with this DC voltage, the charged voltage in the commercial smoothing capacitor 6 is then subjected to ON/OFF control by the control power transistor 15, and the voltage subjected to the ON/OFF control is stepped down via the power transformer 7. As a result, various control power sources required are generated in the smoothing capacitors 9, 11, 13, and 44 which are on the secondary side of the power transformer 7. The control power transistor 15 is controlled by a control IC 14 that monitors the electric current in the control power transistor 15 and/or an output voltage.

Further, backflow preventing diodes 8, 10, 12, and 43 and the smoothing capacitors 9, 11, 13, and 44 provided on the secondary side of the power transformer 7 generate a control power source that corresponds to the smoothing capacitor 11 and for controlling the HVIC 19 in the inverter main circuit in the inverter main body 1, a control power source that corresponds to the smoothing capacitor 13 and for controlling the relay 22 for short-circuiting the rush-current-suppressing resistor 20 by means of the switch 21, a control power source that corresponds to the smoothing capacitor 9 and for controlling an inverter main body microcomputer 17 of an inverter control unit 16 in the inverter main body 1 and a parameter unit microcomputer 29 of a parameter unit 27 outside the inverter main body 1, and a control power source that corresponds to the smoothing capacitor 44 and for controlling a ROM 18 of the inverter control unit 16 and/or a built-in option microcomputer 40 of an internal option 42, respectively.

In FIG. 1, symbols at both ends of the smoothing capacitor 13, symbols at both ends of the smoothing capacitor 11, symbols at both ends of the smoothing capacitor 9, and symbols at both ends of the smoothing capacitor 44 are connected to positions having the same symbols, respectively. The symbol ▼ denotes a connection to the common or the ground.

Thus, the control power source having the smoothing capacitor 13 is a power source of the relay 22, the control power source having the smoothing capacitor 11 is a power source of the HVIC 19, the control power source having the smoothing capacitor 9 is a power source of the inverter main body microcomputer 17 and a power source of the parameter unit microcomputer 29, and the control power source having the smoothing capacitor 44 is a power source of the ROM 18 and a power source of the built-in option microcomputer 40.

In other words, electric power from the various control power sources mentioned above is supplied to the inverter main body microcomputer 17 that is in the inverter control unit 16 built in the inverter main body 1 and that controls the inverter main body 1. The electric power is also supplied to the ROM 18 that is provided in the inverter control unit 16 and that stores an operation status and set-up information. The electric power is further supplied to the parameter unit microcomputer 29 built in the parameter unit 27 that is connected to the inverter main body 1 from the outside and that monitors the driving-state of the inverter main body 1 and/or checks and/or changes the setting. The electric power is also supplied to a built-in option microcomputer 40 built in the built-in option 37 that is connected in the inverter main body 1 and that has an external I/O or performs external communications. Thus, communications can be performed between the microcomputers and/or the peripheral circuits of the inverter control unit 16, the parameter unit 27, and the built-in option 37.

In this embodiment, two types of external power units 32 and 48 are further provided. The external power unit 32 has an external-power-side connector 33 and a battery 34 connected thereto. The external power unit 48 has an external-power-side connector 49 and a battery 50 connected thereto. Herein, external powers of two voltage levels are generated by the external power units 32 and 48, respectively. Reference numerals 31 and 47 denote external power connecting cables, respectively, in FIG. 1.

According to the two types of external power units 32 and 48, the inverter main body 1, the built-in option 37, and the parameter unit 27 have external-power-unit connectors 24, 45, 51, 41, 30, and 46, respectively. The inverter main body 1 and the parameter unit 27 as a unit separate from the inverter main body 1 have an inverter-main body-side connector 25 and a parameter-unit-side connector 28, respectively, that are connected to each other through the connecting cable 26. Likewise, connectors 38 and 39 are provided between the built-in option 37 and the inverter main body 1. The internal option 37 has a built-in-option-side connector 42 that can be connected to an external peripheral device (not shown).

As shown in FIG. 1, the external power unit 32 is connected to the external-power-unit connector 30. The symbols same as those of the terminals of the external-power-unit connector 30 are all connected structurally. Therefore, the external power unit 32 is connected to all of the terminals having the same symbols. In more detail, the external-power-unit connectors 30, 24, and 41 are connected to both ends of the smoothing capacitor 9. As a result, the external power unit 32 is connected to the inverter main body microcomputer 17 of the inverter control unit 16 and to the parameter unit microcomputer 29 of the parameter unit 27. As a result, the same connection state is established regardless of which of the external-power-unit connectors 30, 24, and 41 is/are connected to the external power unit 32. The external power unit 32 is connected to both ends of the smoothing capacitor 9.

As shown in FIG. 1, the external power unit 48 is connected to the external-power-unit connector 46. The symbols same as those of the terminals of the external-power-unit connector 46 are all connected structurally. Therefore, the external power unit 48 is connected to all of the terminals having the same symbols. In more detail, the external-power-unit connectors 46, 45, and 51 are connected to both ends of the smoothing capacitor 44. As a result, the external power unit 48 is connected to the ROM 18 of the inverter control unit 16 and to the built-in option microcomputer 40. The same connection state is established regardless of which of the external-power-unit connectors 46, 45, and 51 is/are connected to the external power unit 48. The external power unit 48 is connected to both ends of the smoothing capacitor 44.

In FIG. 1, an example is shown in which the external-power-unit connectors 24 and 45 are provided in the inverter main body 1, the external-power-unit connectors 30 and 46 are provided in the parameter unit 27, and the external-power-unit connectors 41 and 51 are provided in the built-in option 37. Accordingly, control power required for a desired operation (for example, communications) can be supplied from the external power units 32 and 48 via these external-power-unit connectors 24, 45, 30, 46, 41, and 51.

As a result of connecting the external power units 32 and 48 to any of the external-power-unit connectors 24, 45, 30, 46, 41, and 51 in this manner, communications can be performed among the microcomputers and the peripheral circuits of the inverter control unit 16, the parameter unit 27, and the built-in option 37, and various set values of the inverter main body can be checked and set.

For example, the inverter main body 1 is usually disposed on a board, whereas the parameter unit 27 is disposed at a location (for example, a control room) away or at a distance from the inverter main body 1. Even if the inverter main body 1 and the parameter unit 27 are connected to each other via the connecting cable 26, control power sources can be connected by connecting the external power units 32 and 48 to the parameter unit 27 disposed at the control room as shown in FIG. 1, and various set values of the inverter main body 1 can be checked and changed.

Likewise, in the peripheral devices (not shown) connected to the connector 42 of the built-in option 37, power can be supplied by providing external-power-unit connectors and by forming a structure so that powers of the control sources supplied to the external-power-unit connectors are conducted among the units in the way described above even if an external power unit is connected to the external-power-unit connectors of the peripheral devices.

Therefore, since the control power sources for actuating the microcomputers and the peripheral circuits which are built in and connected to the inverter main body 1 can be supplied from the external power units 32 and 48, set values can be checked and changed even when the inverter main body 1 is being started up or even when a main circuit power source that is the commercial power source of the inverter main body 1 cannot be turned on for fear of damage, for example.

Additionally, since the parameter unit 27, the built-in option 37, and the inverter apparatus 1 have the external-power-unit connectors 24, 45, 30, 46, 41, and 51, positions to which the external power units 32 and 48 are connected can be arbitrarily selected, and operations for checking the inverter main body 1 can be easily performed.

Since the microcomputers of the parameter unit 27, the built-in option 37, and the inverter control unit 16 and the peripheral circuits thereof are actuated if the external power units 32 and 48 are connected to one of the external-power-unit connectors 24, 45, 30, 46, 41, and 51 provided in the parameter unit 27, the built-in option 37, and the inverter main body 1, it is possible to allow a peripheral device, such as a personal computer to monitor and display an operational status or to check and change the setting via the built-in option 37 in addition to the parameter unit 27.

Furthermore, since electric power can be supplied to the microcomputers of the inverter main body 1 or the peripheral circuits thereof even if the parameter unit 27 is located away or at a distance from the inverter main body 1, the operational status can be monitored and the setting can be changed at a remote location for example.

Moreover, since the external power units 32 and 48 are detachable, these can be connected only when the control power sources are required.

In the description above, the inverter control unit 16, the parameter unit 27, and the built-in option 37 are all provided with the external-power-unit connectors. However, any of them may be provided with the external-power-unit connectors. For example, the inverter control unit 16 and the parameter unit 27 may be provided with the external-power-unit connectors, or, alternatively, the inverter control unit 16 and the built-in option 37 may be provided with the external-power-unit connectors.

Second Embodiment

Next, an inverter apparatus according to a second embodiment will be explained with reference to FIG. 2.

In the first embodiment, the number of control power supply voltages required for a desired operation (for example, communications) is two (although the number may be three or more). In contrast, in the second embodiment, one kind of control power supply voltage required for a desired operation (for example, communications) is used. One kind of external power unit is enough if components are chosen in advance so that the number of power sources required for the communications is one. Therefore, an advantage can be found with respect to the size and cost of the inverter apparatus.

In the first embodiment, the external power units 32 and 48 are connected when the control power source is stopped, however, in the second embodiment, an external power unit 32 is connected in addition to a control power source in live wire.

Figure 2:
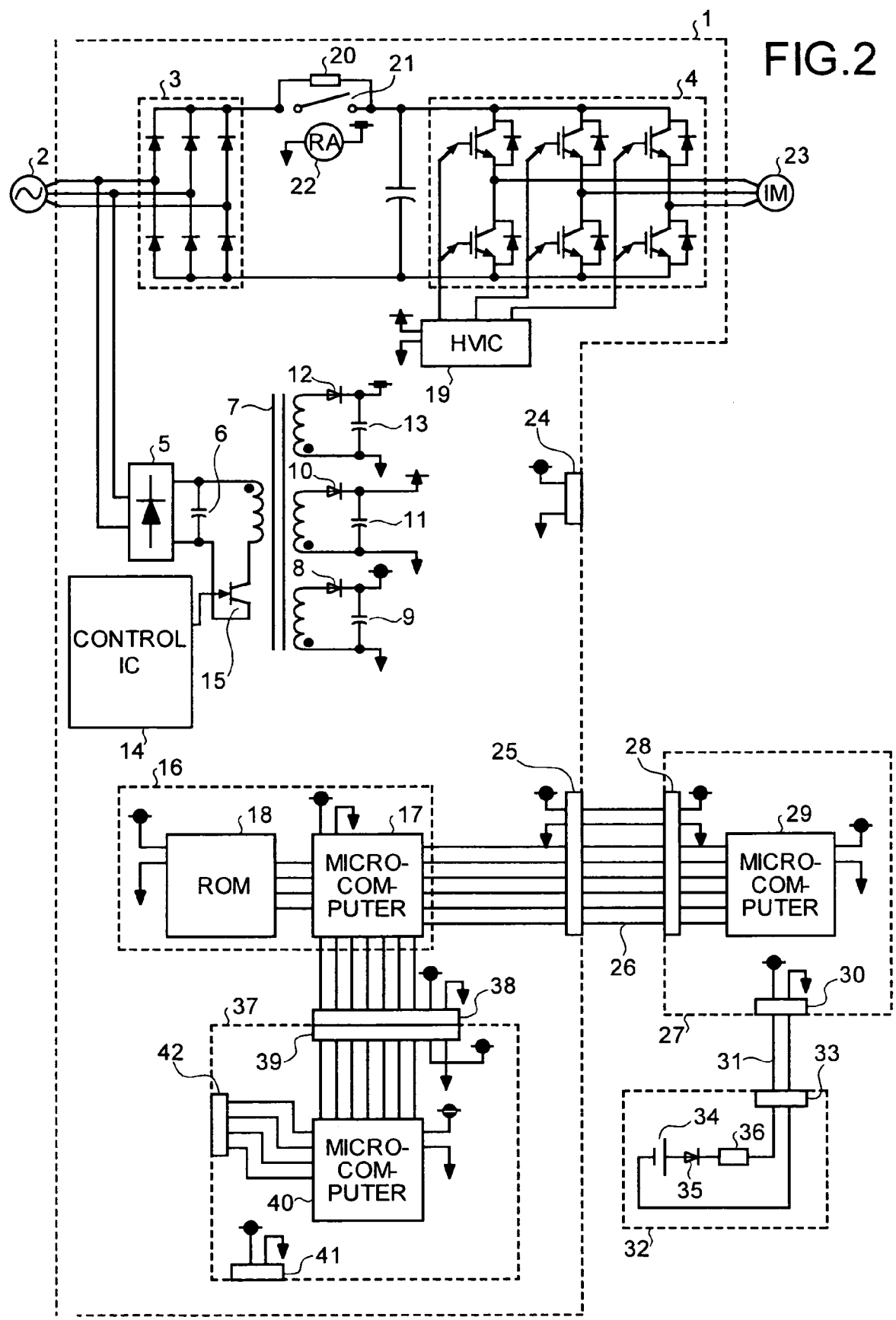
FIG. 2 is an illustration of a configuration of an inverter apparatus according to a second embodiment of the present invention.

For FIG. 2, an explanation for portions same as those in FIG. 1 is omitted. As shown in FIG. 2, an external power unit 32 is formed of a serial structure including a battery 34, a backflow preventing diode 35 that prevents a backflow of an electric current flowing from a control power source generated by a commercial power source 2 toward the battery 34, and an overcurrent protecting PTC thermistor 36 that prevents an overcurrent flowing from the battery 34. The external power unit 32 is connected even if the control power source generated by the commercial power source 2 is in live wire.

An inverter main body 1, a built-in option 37, and a parameter unit 27 include external-power-unit connectors 24, 41, and-30, respectively, according to the external power unit 32.

The external-power-unit connectors 30, 24, and 41 are connected to both ends of the smoothing capacitor 9. As a result, the external power unit 32 is connected to an inverter main body microcomputer 17 of an inverter control unit 16, to a ROM 18, to a built-in option microcomputer 40 of the built-in option 37, and to a parameter unit microcomputer 29 of the parameter unit 27. The external power unit 32 is in the same connection state regardless of which of the external-power-unit connectors 30, 24, and 41 is/are connected to the external power unit 32. The external power unit 32 is connected to both ends of the smoothing capacitor 9.

Communications among the inverter control unit 16, the parameter unit 27, and the built-in option 37 can be performed when the external power unit 32 is connected to any of the external-power-unit connectors 24, 30, and 41 as described above. Therefore, various set values of the inverter apparatus can be checked and set.

Since a protection circuit is added to the external power unit 32 in the second embodiment, the external power unit 32 can always be connected regardless of the presence or absence of a control power source. Therefore, the control power source generated by the commercial power source 2 is used when the commercial power source 2 is connected to the inverter main body 1. Immediate switching to the power supply by the external power unit 32 is performed when the commercial power source 2 is cut off.

Communications can be performed, and error information can be transmitted to the peripheral devices attached to the parameter unit 27 or the built-in option 37 even when the commercial power source 2 is accidentally cut off. Further, internal electronic devices can be protected when the control power source is accidentally cut off.

Thus, in the second embodiment, effects same as those in the first embodiment are achieved. In addition, since the external power unit 32 is provided with the backflow preventing function, electric power can be prevented from flowing from the control power source to the external power unit 32 even when the commercial power source 2 of the inverter main body 1 is connected to generate the control power source of the inverter main body 1. Further, electric power can be supplied from the external power unit 32 even when the commercial power source 2 and the control power source are cut off. Therefore, the setting can be maintained and data can be prevented from being lost even when the power sources are accidentally cut off. Moreover, since the overcurrent preventing function is provided, an electric power supply from the external power unit 32 can be controlled when a load connected to the external power unit 32 breaks down because of a short-circuit mode.

Third Embodiment

Figure 3:
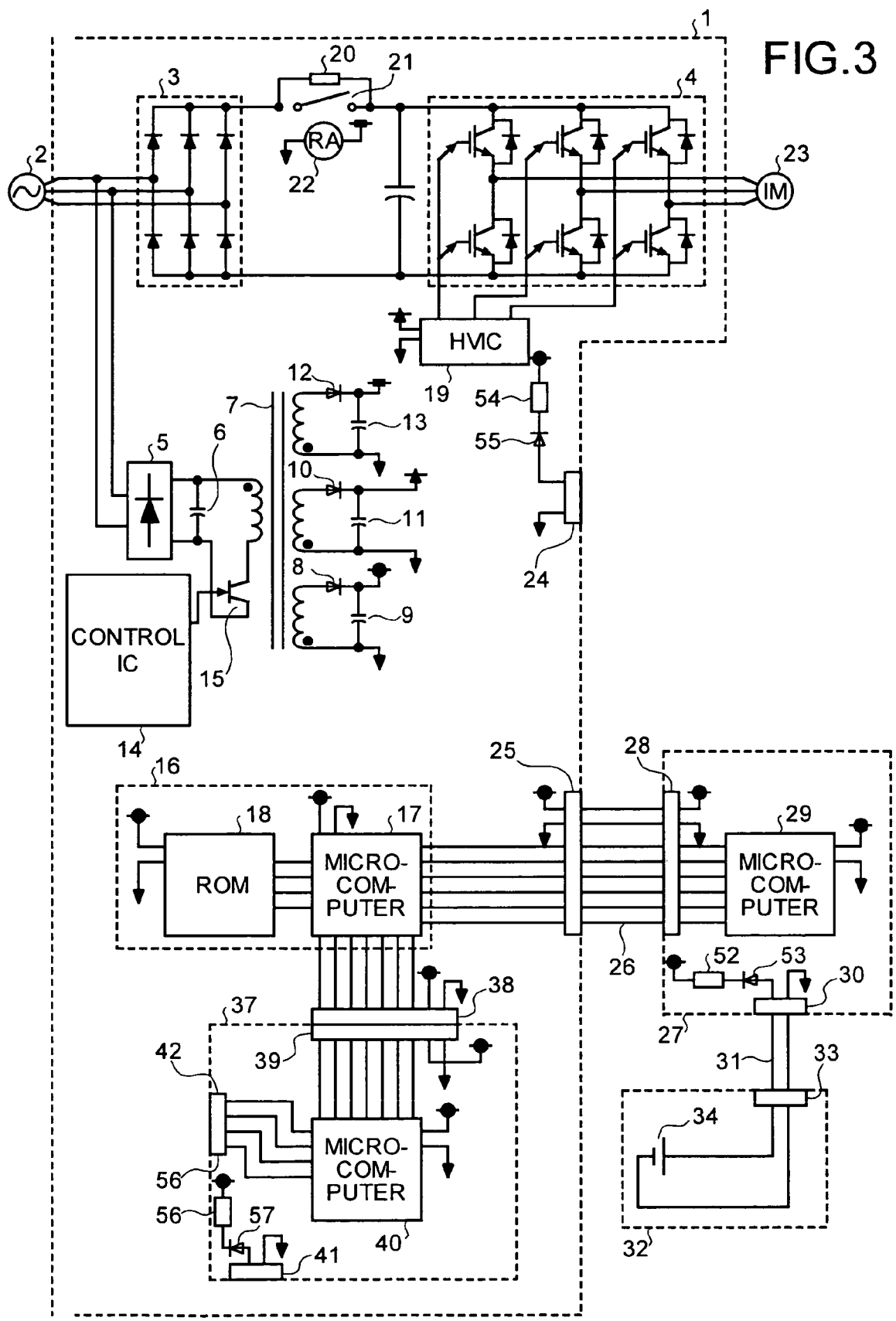
FIG. 3 is an illustration of a configuration of an inverter apparatus according to a third embodiment of the present invention.

Next, an inverter apparatus according to a third embodiment will be explained with reference to FIG. 3.

In the second embodiment explained above, the protection circuit including the backflow preventing diode and the overcurrent protecting PTC thermistor 36 is added in the external power unit 32. In contrast, in the third embodiment, the external-power-unit connectors 24, 30, and 41 of the inverter main body 1, the parameter unit 27, and the built-in option 37 are each provided with a protection circuit. That is, as shown in FIG. 3, the protection circuit including a backflow preventing diode 55 for preventing an electric current from flowing backward from a control power source generated by the commercial power source 2 and an overcurrent protecting PTC thermistor 54 for preventing an overcurrent flowing from the battery 34 of the external power unit 32 is added to the external-power-unit connector 24 of the inverter main body 1. Further, a protection circuit including a backflow preventing diode 53 for preventing an electric current from flowing backward from a control power source generated by the commercial power source 2 and an overcurrent protecting PTC thermistor 52 for preventing an overcurrent flowing from the battery 34 of the external power unit 32 is added to the external-power-unit connector 30 of the parameter unit 27. Further, a protection circuit including a backflow preventing diode 57 for preventing an electric current from flowing backward from a control power source generated by the commercial power source 2 and an overcurrent protecting PTC thermistor 56 for preventing an overcurrent flowing from the battery 34 of the external power unit 32 is added to the external-power-unit connector 41 of the built-in option 37.

According to the second embodiment, the external power unit 32 added with the protection circuit is required. A According to the third embodiment, the protection circuits are added to the external-power-unit connectors 24, 30, and 41 of the inverter main body 1, the parameter unit 27, and the built-in option 37, and hence a standard external power unit, such as that of the first embodiment, can be used as the external power unit 32.

INDUSTRIAL APPLICABILITY

As explained above, using the inverter apparatus according to the present invention, monitoring and displaying an operational status and checking and changing the setting, even when a commercial power source or a control power source is cut off, can be carried out, and the inverter apparatus is suitable for controlling motors with a wider variety of functions.

The invention claimed is:

1. An inverter apparatus comprising:
an inverter main body;
a built-in option connected in the inverter main body;
a parameter unit connected to the inverter main body from outside;
a control power source adapted to generate power from a commercial power supply voltage and is connected to a microcomputer or a peripheral circuit included in at least one of the inverter main body, the built-in option, and the parameter unit;
at least a first external-power-unit connector via which a first external power unit can be connected to at least one of the inverter main body, the built-in option, and the parameter unit, wherein the first external power unit connected to the first external-power-unit connector is configured to function as a first power source that controls the microcomputer or the peripheral circuit included in at least one of the inverter main body, the built-in option, and the parameter unit; and
optionally, a second external-power-unit connector, separate from the first external-power-unit connector, via which a second external power unit, separate from the first external power unit, can be connected to at least one of the inverter main body, the built-in option, and the parameter unit,
wherein the second external power unit connected to the second external-power-unit connector is configured to function as a second power source that controls the microcomputer or the peripheral circuit included in at least one of the inverter main body, the built-in option, and the parameter unit.

2. The inverter apparatus according to claim 1, wherein a type of the first external-power-unit connector and a type of the first external power unit are set according to a voltage level of the control power source.

3. The inverter apparatus according to claim 2, further comprising a plurality of control power sources, wherein voltage levels of the control power sources are all of equal potentials.

4. The inverter apparatus according to claim 1, wherein at least one of the first external-power-unit connector and the first external power unit comprises a backward-flow preventing unit and an overcurrent preventing unit.

5. The inverter apparatus according to claim 1, wherein the peripheral circuit includes a peripheral device connected to an external I/O of the built-in option.

6. The inverter apparatus according to claim 1, wherein the first external power unit is connected to the microcomputer included in the inverter main body to function as the first power source controlling the microcomputer, wherein the microcomputer controls operations of the inverter main body, and the second external power unit is connected to the peripheral circuit included in the inverter main body to function as the second power source controlling the peripheral circuit, wherein the peripheral circuit stores an operation status and setup information of the inverter main body.

7. The inverter apparatus according to claim 6, wherein at least one of the first external power unit and the second external power unit is detachable.

* * * * *